United States Patent
Shigeta et al.

(10) Patent No.: US 11,400,791 B2
(45) Date of Patent: Aug. 2, 2022

(54) ON-VEHICLE AIR CONDITIONER

(71) Applicant: Toyota Jidosha Kabushiki Kaisha, Toyota (JP)

(72) Inventors: Shunsuke Shigeta, Toyota (JP); Daisuke Sakamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 21 days.

(21) Appl. No.: 17/117,750

(22) Filed: Dec. 10, 2020

(65) Prior Publication Data

US 2021/0188039 A1   Jun. 24, 2021

(30) Foreign Application Priority Data

Dec. 18, 2019   (JP) ............... JP2019-228437

(51) Int. Cl.
*B60H 1/00*   (2006.01)
*B60H 1/24*   (2006.01)
*B60H 1/26*   (2006.01)

(52) U.S. Cl.
CPC .......... *B60H 1/00371* (2013.01); *B60H 1/00* (2013.01); *B60H 1/241* (2013.01); *B60H 1/246* (2013.01); *B60H 1/26* (2013.01); *B60H 1/262* (2013.01); *B60H 1/265* (2013.01); *B60H 1/267* (2013.01)

(58) Field of Classification Search
CPC ...... B60H 1/00371; B60H 1/00; B60H 1/241; B60H 1/246; B60H 1/26; B60H 1/262; B60H 1/265; B60H 1/267; B60H 1/245; B60H 1/247; B60H 1/00357; B60H 1/00385; B60H 1/24; B60J 9/04
USPC ............................ 454/95, 99, 105, 118, 139
See application file for complete search history.

(56) References Cited

U.S. PATENT DOCUMENTS

| | | | | |
|---|---|---|---|---|
| 2,036,672 A | * | 4/1936 | Anderson | B61D 27/009 454/117 |
| 3,763,761 A | * | 10/1973 | Anderson | B60H 1/00371 165/126 |
| 2019/0337535 A1 | * | 11/2019 | Onitake | B60H 3/06 |
| 2020/0171915 A1 | * | 6/2020 | Sakurai | B60H 1/245 |

FOREIGN PATENT DOCUMENTS

| | | |
|---|---|---|
| EP | 0014777 A1 * | 9/1980 |
| JP | S61109816 U * | 7/1986 |
| JP | H08048151 A | 2/1996 |

* cited by examiner

*Primary Examiner* — Jessica Yuen
(74) *Attorney, Agent, or Firm* — Dinsmore & Shohl LLP

(57) ABSTRACT

An on-vehicle air conditioner includes a suction port disposed on a ceiling of a vehicle cabin to suction air within the vehicle cabin, a door discharge port disposed at an upper end of a door opening portion located on a wall face of the vehicle to discharge air downward, and an upper duct configured to guide to the door discharge port the air suctioned by the suction port.

6 Claims, 4 Drawing Sheets

ON-VEHICLE AIR CONDITIONER

CROSS REFERENCE TO RELATED APPLICATION

This application claims priority to Japanese Patent Application No. 2019-228437 filed on Dec. 18, 2019, which is incorporated herein by reference in its entirety including the specification, claims, drawings, and abstract.

TECHNICAL FIELD

The present disclosure relates to an air conditioner mounted in a vehicle.

BACKGROUND

A vehicle typically includes an air conditioner that regulates a temperature within a vehicle cabin. When an opening portion, such as a door, is opened while the vehicle cabin is being air-conditioned by an air conditioner, air-conditioned air within the vehicle cabin flows out of the vehicle cabin and the outside air which is not air-conditioned flows into the vehicle cabin, resulting in a reduction in air conditioning efficiency. Therefore, opening of the opening portion such as a door should be avoided as much as possible during air conditioning; however, it is impractical to completely avoid opening of the opening portion. In particular, in vehicles, such as buses, taxis, and delivery vehicles, that frequently stop to allow a passenger to get in or get out, the door opening portion is frequently opened.

Techniques for inhibiting reduction in the air conditioning efficiency even when a door is opened have been proposed. JP H08-48151 A, for example, discloses a vehicle air conditioner including an air blowoff port and an air suction port disposed opposite to each other around an opening portion of a door. This vehicle air conditioner blows air which is fed under pressurization from a fan actuated in association with opening/closing of the door through the air blowoff port and then suctions the air by the air suction port, to thereby form an air curtain that covers the opening portion. This technique reduces flowing of the air within the vehicle cabin out of the vehicle and flowing of the outside air which is not air-conditioned into the vehicle cabin to a certain degree, even when the door opening is opened, thereby somewhat improving the air conditioning efficiency.

In the vehicle air conditioner disclosed in JP H08-48151 A, however, the air suction port disposed near the door opening is likely to suction not only the air discharged from the blowoff port but also the outside air. In this configuration, the air outside of the vehicle, which is not air-conditioned, is introduced into the vehicle cabin, which hampers sufficient improvement of the air conditioning efficiency.

An embodiment of the disclosure is therefore directed toward an on-vehicle air conditioner with increased air conditioning efficiency.

SUMMARY

In accordance with an aspect of the disclosure, an on-vehicle air conditioner includes a suction port disposed on a ceiling portion of a vehicle cabin to suction air within the vehicle cabin, a discharge port disposed at an upper end of an opening portion formed on a wall face of a vehicle to discharge air downward, and a duct configured to guide to the discharge port air suctioned by the suction port.

Air is discharged downward from the discharge port disposed on the upper end of the opening portion to form an air curtain that covers the opening portion, thereby reducing outflow of the inside air and inflow of the outside air. Further, the suction port disposed on the ceiling of the vehicle cabin effectively reduces suctioning of outside air through the suction port. This reduces the inflow of outside air into the vehicle cabin more effectively to further increase the air conditioning efficiency.

In the above configuration, the discharge port may include a door discharge port disposed on a top portion of a door opening portion formed in a center of a side portion of the vehicle, the suction port may include a front suction port located further forward of the vehicle with respect to the door opening portion and a rear suction port located further rearward of the vehicle with respect to the door opening portion, and the duct may include a front upper duct that allows communication between the front suction port and the door discharge port and a rear upper duct that allows communication between the rear suction port and the door discharge port.

The suction ports disposed at locations shifted from the door opening portion in the vehicle length direction effectively reduce suctioning of outside air through the suction ports. This further reduces the inflow of outside air into the vehicle cabin and further increases the air conditioning efficiency.

The on-vehicle air conditioner may further include a blast port configured to discharge air along a floor surface of the vehicle cabin toward the center of the vehicle cabin.

This configuration allows the air near the floor surface to converge at the center of the vehicle cabin and then to rise toward the ceiling where the suction ports are disposed. This enables further smooth circulation of the air within the vehicle cabin.

The on-vehicle air conditioner may further include a plurality of blast ports configured to discharge air along a floor surface of the vehicle cabin toward the center of the vehicle cabin, and, of the plurality of blast ports, a blast port disposed opposite the door opening portion may blow air at a higher airflow rate than that of a blast port disposed in a center of the vehicle cabin in the vehicle width direction to send air along a length of the vehicle.

This configuration more reliably reduces entry of the outside air through the door opening portion, thereby further increasing the air conditioning efficiency.

The on-vehicle air conditioner may further include a plurality of blast ports configured to discharge air along a floor surface of the vehicle cabin toward the center of the vehicle cabin, and, of the plurality of blast ports, a blast port disposed at an end of the vehicle cabin in the vehicle width direction closer to the door opening portion may blow air at a higher airflow rate than that of a blast port disposed in a center of the vehicle cabin in the vehicle width direction to thereby send air along a length of the vehicle.

This configuration more reliably reduces entry of the outside air through the door opening portion, thereby further increasing the air conditioning efficiency.

The on-vehicle air conditioner may further include an air-conditioning controller configured to control suction and discharge of air. The air-conditioning controller may be capable of receiving an open/close signal for the opening portion, to allow discharge of air from the discharge port while the opening portion is opened and to stop discharge of air from the discharge port while the opening portion is closed.

This configuration allows further reduction in the power consumption as compared to the case where the air curtain is continuously formed.

The discharge port may be disposed on the ceiling at a location further inward in the vehicle width direction with respect to the door opening portion, and the air may be discharged from the discharge port obliquely such that the air goes further outward as it proceeds further downward to reach ends of a floor surface in the vehicle width direction.

As the upper end portion of the door opening portion, where a large number of door moving mechanisms such as rails are disposed, does not have a sufficient space for the discharge port, the discharge port is disposed further inward in the vehicle width direction with respect to the door opening portion. In this configuration, the discharge port is configured to discharge air obliquely such that the air goes further outward as it proceeds further downward to thereby reach the ends of the floor surface in the vehicle width direction. This configuration reduces a space between the door opening portion and the air curtain, to thereby effectively reduce entry of the outside air into the vehicle cabin.

The air conditioner according to the preset disclosure achieves further increase in the air conditioning efficiency.

BRIEF DESCRIPTION OF DRAWINGS

Embodiment(s) of the present disclosure will be described based on the following figures, wherein.

DESCRIPTION OF EMBODIMENTS

Figure 1:
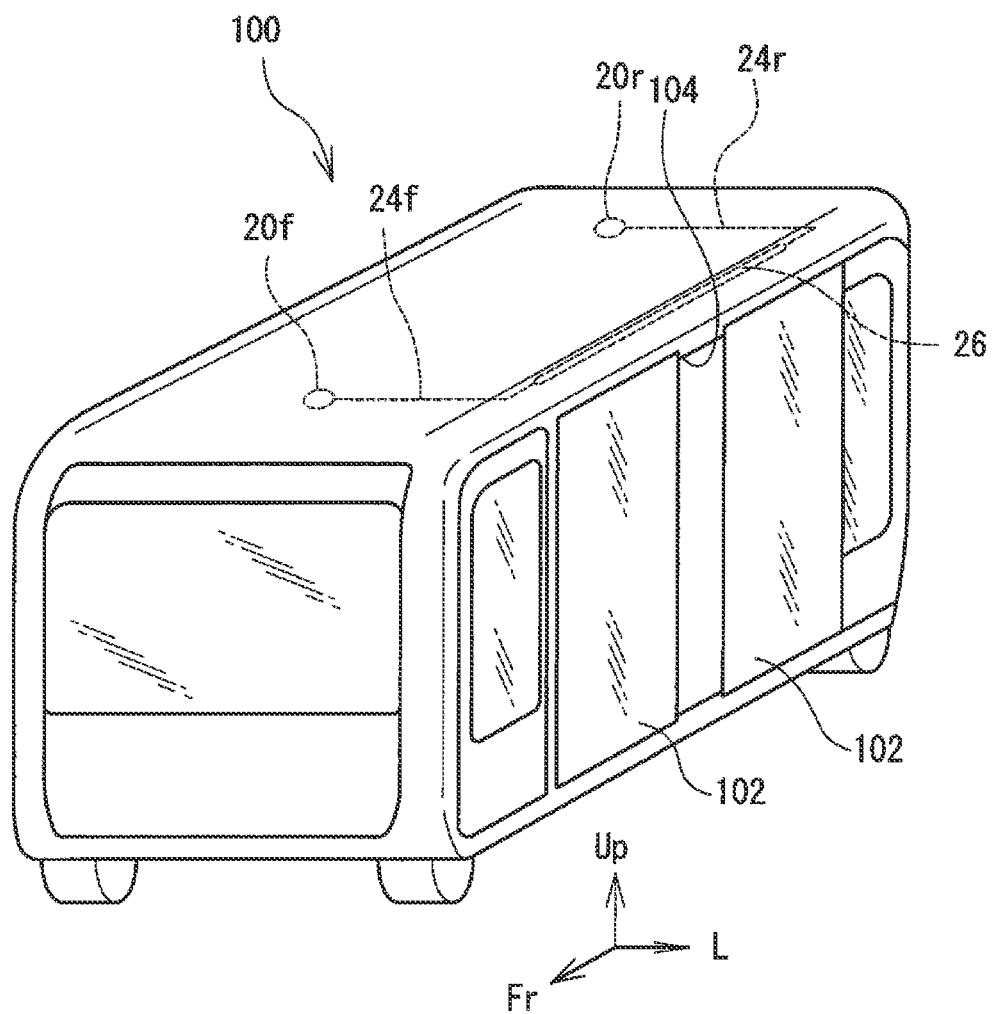
FIG. 1 is a perspective view of a vehicle viewed from outside.

The configuration of a vehicle 100 including an air conditioner 10 will be described below by reference to the drawings. In each of the drawings, symbols "Fr", "Up", and "L" indicate forward of the vehicle, upward of the vehicle, and leftward of the vehicle along its width, respectively. FIG. 1 is a perspective view of the vehicle 100 viewed from the outside. The vehicle 100 is used as a bus that transports passengers while traveling by automated driving along a predetermined route within a specific area. The vehicle 100 therefore repeatedly stops and starts at a relatively high frequency and also opens and closes doors 102 for passengers' boarding and discharging at a relatively high frequency.

However, usage of the vehicle 100 in this disclosure may be modified as appropriate; the vehicle 100 may be used as a movable business space, such as a shop including a retail shop that sells various displayed items or a restaurant that provides cooked food and drinks. In another aspect, the vehicle 100 may be used as an office where office work or a meeting with customers is performed, for example. The vehicle 100 may also be used as a taxi, a bus, and a transporting vehicle that transport passengers or cargo. The vehicle 100 may be used not only in a business scene but also as a transport unit for an individual. The travelling pattern and the travelling speed of the vehicle 100 may also be modified as appropriate.

The vehicle 100 is an electric vehicle including a drive motor as a motor. The vehicle 100 includes a main battery (not shown) that supplies electric power to the drive motor. The air conditioner 10, which will be described below, is driven by electric power supplied from the main battery. The main battery is a rechargeable storage battery and is regularly charged with external electric power. Here, the vehicle 100 is not limited to an electric vehicle, and may be any type of automotive vehicle that includes a battery that supplies electric power to the air conditioner 10. For example, the vehicle 100 may be an engine vehicle including an engine as a motor, or a hybrid vehicle including an engine and a drive motor as a motor. Alternatively, the vehicle 100 may be a fuel cell vehicle including a fuel cell that generates electric power to drive a drive motor.

As described above, the vehicle 100 is capable of travelling by automated driving. Here, "automated driving" indicates that almost all the dynamic driving tasks are performed by the vehicle 100, and refers to any of Level 3 to Level 5 defined by the Society of Automotive Engineers (SAE) in the United States. In Level 3 driving automation, while all of dynamic driving tasks are automated in specific places such as highways, driver's manipulation is still required in case of emergency. In Level 4 driving automation, all of dynamic driving tasks are automated and responses in case of emergency are also performed automatically in limited specific places. In Level 5 driving automation, automated driving is possible under almost all conditions without limitation of places, for example, which corresponds to "full automated driving". However, the vehicle 100 may be a vehicle having no automated driving functions, in which all or part of the dynamic driving tasks are performed by a driver. For example, the vehicle 100 may be any of Level 0 to Level 2 defined by the SAE. In Level 0, all dynamic driving tasks are performed by the driver. In Level 1 driving automation, the vehicle 100 provides support for either one of steering and accelerating/decelerating. In Level 2 automation, the vehicle 100 provides support for both steering and accelerating/decelerating in combination.

As illustrated in FIG. 1, the vehicle 100 does not include a hood or a trunk, and has an outer shape of a substantially box (a rectangular parallelepiped shape) having a front end face and a rear end face standing substantially upright. The vehicle 100 includes, in the center of a left side face, a door opening portion 104 for boarding and discharging passengers. The door opening portion 104 is covered, in an openable manner, with double-leaf slidable doors 102 that are slidable along the length of the vehicle. In the illustrated example, the doors 102 are formed only on one side face of the two side faces in the vehicle width direction; the doors 102 are not formed on the other side face.

Figure 2:
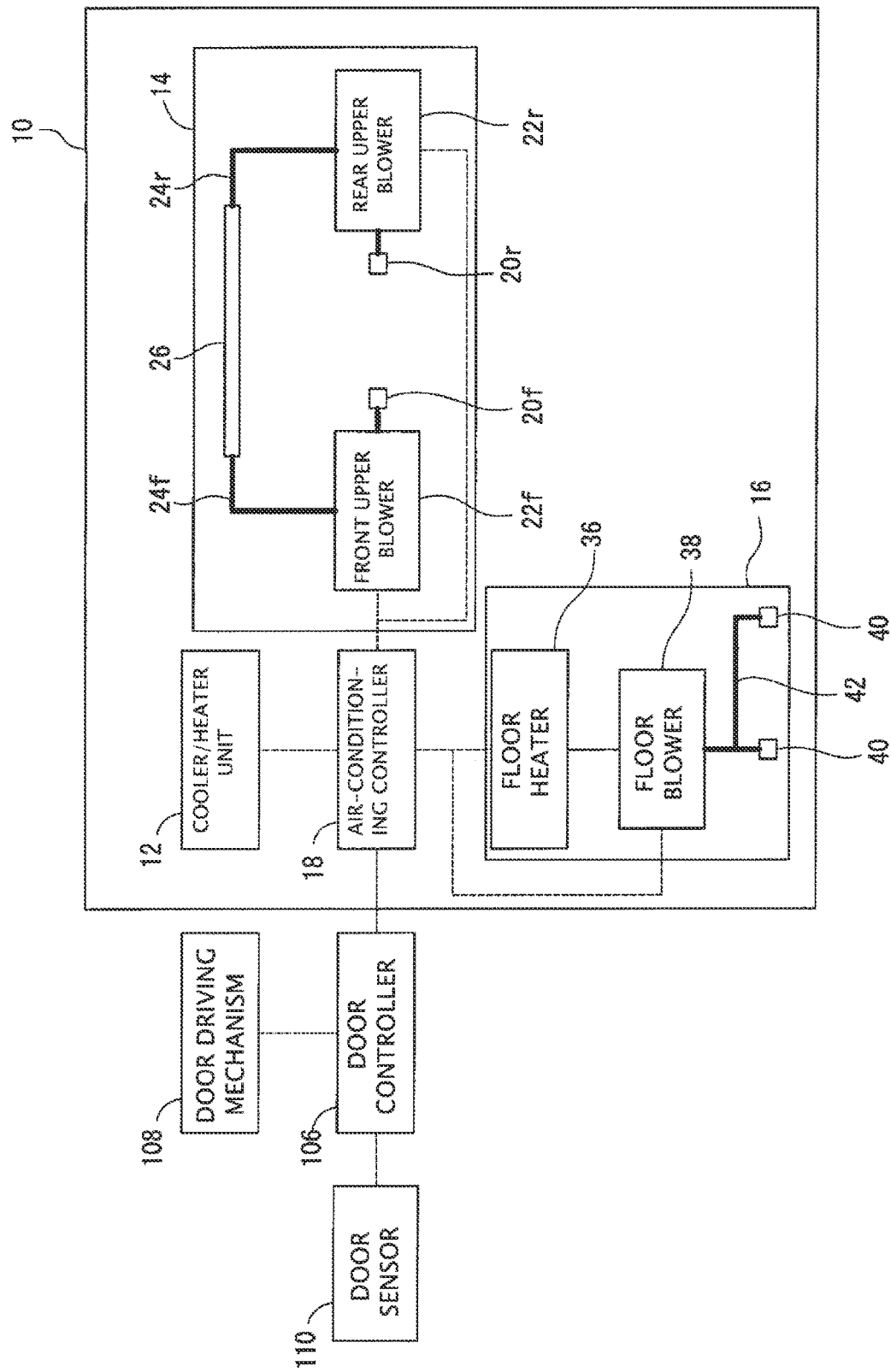
FIG. 2 is a block diagram illustrating a configuration of an air conditioner.

As described above, the vehicle 100 in this example is used as a bus for transporting passengers. In this case, the doors 102 are frequently opened or closed to allow boarding and discharging of the passengers, which leads to a reduction in air conditioning efficiency. More specifically, if the doors 102 are opened while the interior of the vehicle cabin is air-conditioned, inside air which is air-conditioned flows out through the door opening portion 104 and outside air which is not air-conditioned flows into the vehicle cabin through the door opening portion 104. This requires extra electric power to maintain the temperature within the vehicle cabin as determined, thereby increasing power consumption of the air conditioner 10. In particular, if the vehicle 100 is an electric vehicle that travels by electric power, an increase in the power consumption of the air conditioner 10 causes a reduction in cruising range. Thus, a reduction in the air conditioning efficiency is a serious problem The air conditioner 10 according to the embodiment therefore increases the air conditioning efficiency, as will be described below. FIG. 2 is a block diagram illustrating the configuration of the air conditioner 10. As illustrated in FIG. 2, the air conditioner 10 broadly includes a cooler/heater unit 12, a ceiling unit 14, a floor unit 16, and an air-conditioning controller 18 that controls driving of these units. The cooler/heater unit 12 cools or heats the interior of the vehicle cabin, and may include a known heat pump air-conditioning mechanism. The cooler/heater unit 12 may therefore include, for example, a compressor that compresses a coolant, a condenser that performs heat exchange between a coolant and the outside air, and a duct through which a coolant flows, which are not shown.

The ceiling unit 14 is configured to form an air curtain, which will be described below, in the door opening portion 104. The ceiling unit 14 guides the air within the vehicle cabin that is suctioned by a front suction port 20f and a rear suction port 20r (which will be referred to as "suction ports 20" when used in an undistinguishing manner), via a front upper duct 24f and a rear upper duct 24r, to a door discharge port 26, and discharges the air through the door discharge port 26. As illustrated in FIG. 1, both the front suction port 20f and the rear suction port 20r are disposed on a ceiling portion of the vehicle 100. More specifically, the front suction port 20f is positioned further forward of the vehicle and further toward the center of the vehicle along its width direction with respect to the door opening portion 104, and the rear suction port 20r is positioned further rearward of the vehicle and further toward the center in the vehicle width direction with respect to the door opening portion 104 (see FIG. 5). In other words, the front suction port 20f and the rear suction port 20r are disposed at locations shifted from the door opening portion 104 in the vehicle length direction when viewed from a side of the vehicle, and shifted from the door opening portion 104 in the vehicle width direction when viewed from the front of the vehicle. The arrangement of the suction ports 20 disposed at locations shifted from the door opening portion 104 as described above effectively inhibits suction of the outside air through the suction ports 20 and thus inhibits the inflow of the outside air into the vehicle cabin.

The front suction port 20f and the rear suction port 20r communicate with the front upper duct 24f and the rear upper duct 24r (which will be referred to as "upper ducts 24" when used in an undistinguishing manner). The ceiling unit 14 further includes a front upper blower 22f and a rear upper blower 22r (which will be referred to as "upper blowers 22" when used in an undistinguishing manner) in the middle of the respective upper ducts 24. The upper blowers 22 are driven to pressure-feed along the upper ducts 24 the air suctioned through the suction ports 20. While FIG. 1 does not show the upper blowers 22, the upper blowers 22 are also disposed on the ceiling portion of the vehicle 100 along with the upper ducts 24 and other elements described above.

Each upper duct 24 communicates the corresponding suction port 20 with the door discharge port 26. As illustrated in FIG. 1, the door discharge port 26 is disposed on an upper end of the door opening portion 104. The "upper end of the door opening portion 104" refers, for example, to a region defined between the upper edge of the door opening portion 104 and an end of the vehicle cabin ceiling in the vehicle width direction closer to the door opening portion 104. In this example, the door opening portion 104 is disposed at an end of the vehicle cabin ceiling in the vehicle width direction close to the door opening portion 104. The door discharge port 26 discharges in a downward direction air within the vehicle cabin guided by the upper duct 24. In this example, the door discharge port 26 is capable of discharging the air planarly and has a slit opening with a length substantially the same as or greater than the opening width of the door opening portion 104. This configuration enables formation of an air curtain over the entire region of the door opening portion 104, as will be described below. The door discharge port 26, however, may have any shape that allows downward discharge of air; for example, the door discharge port 26 may include a plurality of round holes arranged at equal intervals for discharging air.

The floor unit 16 includes a floor heater 36, a floor blower 38, a floor duct 42, and a plurality of blast ports 40. The floor heater 36 heats the air flowing through the floor duct 42. The floor heater 36 may be any heater that is capable of heating air to flow into the floor duct 42. Therefore, the floor heater 36 may be a water heater including a PTC element or a nichrome wire to heat water flowing through a flow channel (not shown), for example. In this configuration, the air within the floor duct 42 is heated by heat exchange between the air flowing within the floor duct 42 and the heated water flowing within the flow channel. The floor unit 16 includes the floor blower 38 in the middle of the floor duct 42. The floor blower 38 is driven to pressure-feed the air within the floor duct 42 to the blast ports 40 which will be described below.

The blast ports 40 are disposed near the floor surface of the vehicle cabin (e.g., below the on-vehicle seat) to blow the air along the floor surface of the vehicle cabin. The air supplied from the blast port 40 is hot while the floor heater 36 is driven, whereas, when the floor heater 36 is not driven, the air has the same temperature as that within the vehicle cabin. As will be described below, the blast port 40 blows air from the vicinity of peripheral region of the vehicle cabin toward the center of the vehicle cabin. This configuration allows the air within the vehicle cabin to converge into the center of the vehicle cabin and thereafter flow upward or toward the suction port 20, which will be described below. While FIG. 2 illustrates a single floor heater 36 and a single floor blower 38, a plurality of floor heaters 36 or a plurality of floor blowers 38 may be disposed. Further, the number of blast ports 40 for one floor blower 38 is not particularly limited; one blast port 40 or three blast ports 40 may be disposed for one floor blower 38.

The air-conditioning controller 18, which controls driving of the cooler/heater unit 12, the ceiling unit 14, and the floor unit 16, is a computer including a processor and a memory, for example. The "computer" includes a micro controller incorporating a computer system in a single integrated circuit. The processor refers to a processor in a broad sense, and includes a general-use processor such as a Central Processing Unit (CPU), for example, and a dedicated-use processor such as a Graphics Processing Unit (GPU), an Application Specific Integrated Circuit (ASIC), a Field Programmable Gate Array (FPGA), or a Programmable Logic Device, for example. The operation of the processor which will be described below may be executed by a single processor or a plurality of processors in cooperation, which are disposed physically apart from each other. The order of the operations executed by the processor is not limited to that described in each example, and may be modified as appropriate. Similarly, in some embodiments, the memory is not be a physically single element, and includes a plurality of memories that are physically apart from each other. The memory may include at least one of a semiconductor memory (RAM, ROM, or solid-state drive, for example) or a magnetic disk (hard disk drive, for example).

In accordance with an air-conditioning instruction from the operator, the air-conditioning controller 18 drives the cooler/heater unit 12 and the floor unit 16 to regulate the temperature of the interior of the vehicle cabin at a desired temperature. The air-conditioning controller 18 further drives the ceiling unit 14 in response to a door open/close signal supplied from a door controller 106, which will be descried below, to form the air curtain in the door opening portion 104, as will be described below.

The vehicle 100 further includes the door controller 106, a door driving mechanism 108, and a door sensor 110. The door driving mechanism 108 opens or closes the doors 102, and includes, for example, a latch mechanism for restricting opening of the doors 102 and a slide mechanism for moving the doors 102 slidably. Both the latch mechanism and the slide mechanism may include, as a drive source, an electric-powered actuator such as a motor, a hydraulic cylinder, or an electromagnetic cylinder, to enable electrical-powered control of these mechanisms. In this configuration, driving of the electric-powered actuator is controlled by the door controller 106.

The door sensor 110 detects opening or closing of the doors 102. Specifically, the door sensor 110 outputs an ON signal when the doors 102 are completely closed, and outputs an OFF signal when the doors 102 are opened even slightly. The signal from the door sensor 110 is input to the door controller 106.

The door controller 106, similar to the air-conditioning controller 18, is a computer including a processor and a memory. While FIG. 2 illustrates the door controller 106 and the air-conditioning controller 18 as discrete components, these controllers may be a single device. In other words, a single computer may function as both the door controller 106 and the air-conditioning controller 18.

In response to an instruction from the operator, the door controller 106 drives the door driving mechanism 108 to open or close the doors. The door controller 106 may automatically open the doors 102 in accordance with the operation situation of the vehicle 100. Specifically, as the vehicle 100 in this example is used as a bus that stops at each stopping place to allow boarding and discharging of passengers, the door controller 106 may automatically open the doors 102 in response to stopping of the vehicle 100 at a stopping place. The door controller 106 receives a signal from the door sensor 110 and sends the signal to the air-conditioning controller 18.

Figure 3:
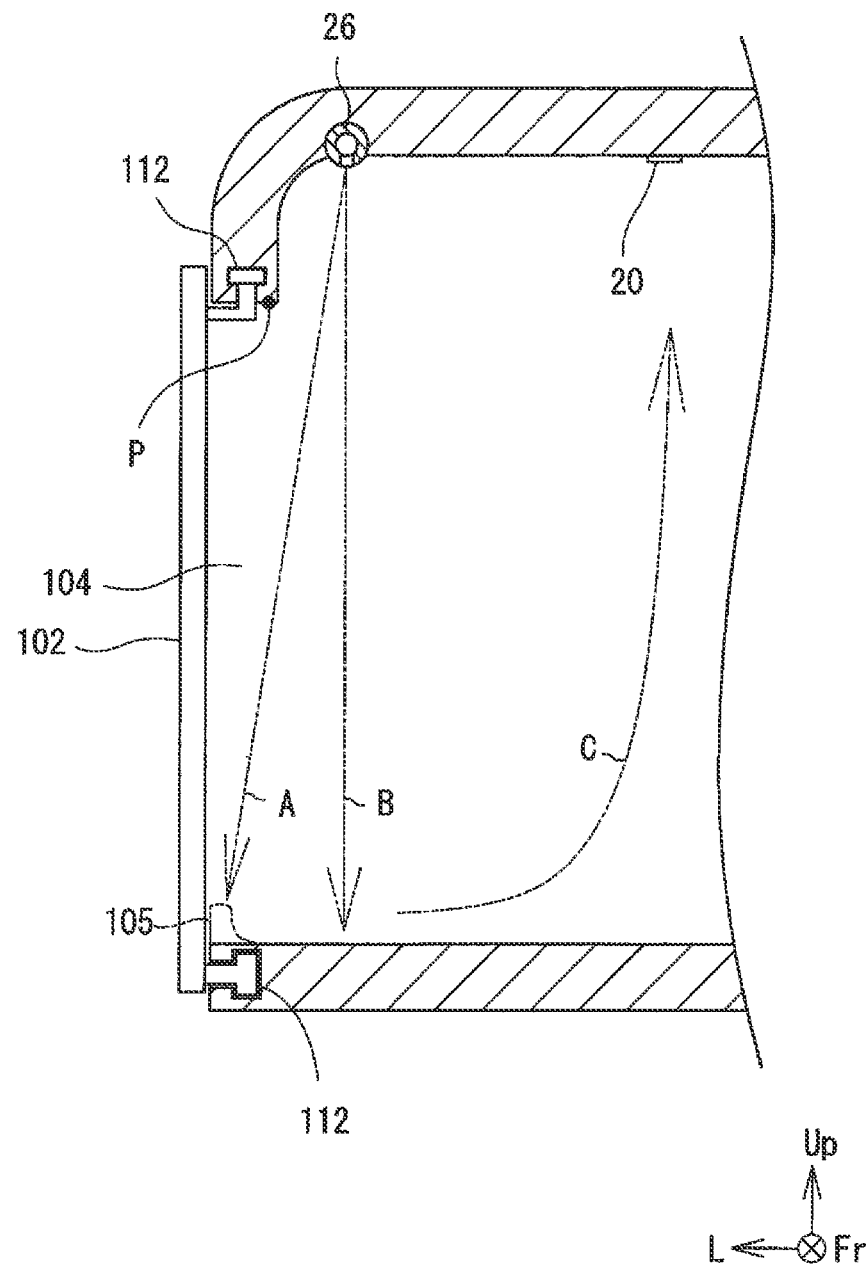
FIG. 3 is a cross sectional view schematically illustrating a portion of the vehicle near the door opening portion.

Referring now to FIG. 3, formation of an air curtain by the air conditioner 10 will be described. FIG. 3 is a cross sectional view schematically illustrating a portion of the vehicle 100 near the door opening portion 104. As illustrated in FIG. 3, and as described above, the vehicle 100 includes, on its side, the door opening portion 104 which is covered with the slidable doors 102 in an openable/closable manner. The vehicle includes rails 112 on the upper end of the door opening portion 104 and the floor surface for guiding a sliding movement of the doors 102.

The door discharge port 26 is disposed at a location on the ceiling of the vehicle cabin which is slightly shifted from the upper edge of the door opening portion 104 toward the center of the vehicle cabin. When the doors 102 are opened, the air-conditioning controller 18 drives the upper blowers 22 to discharge the air, which is air-conditioned air suctioned from the interior of the vehicle cabin through the suction ports 20, downward from the door discharge port 26. The door discharge port 26 is a slit hole and discharges the air planarly. The air-conditioned air is discharged planarly from above the door opening portion 104 in this manner to thereby form an air curtain in the door opening portion 104, which reduces leakage of cool air or warm air by an air flow.

The air curtain thus formed effectively inhibits flow of the air-conditioned air within the vehicle cabin outward and flow of the air outside the vehicle into the vehicle cabin. This maintains the air within the vehicle cabin at a fixed temperature to thereby allow saving of an extra power required for heating or cooling. Here, while power to drive the upper blowers 22 is required for forming the air curtain, the power to drive the upper blowers 22 is significantly smaller than the power to heat or cool the air. Therefore, the air curtain reduces the power required for air conditioning and further increases the air conditioning efficiency.

The air may be discharged from the door discharge port 26 vertically downward or slightly obliquely. For example, as indicated by an arrow A in FIG. 3, the air may be discharged obliquely such that the air goes further outward as it proceeds further downward to reach the lower edge of the door opening portion 104. This configuration reduces a space between the door opening portion 104 and the air curtain, to thereby effectively reduce entry of the outside air into the vehicle cabin.

The direction in which the air is discharged may be switched between heating time and cooling time. Specifically, the door discharge port 26 may be made rotatable or may have rotatable louvers attached thereto to allow change of the rotation angle of the door discharge port 26 or the louvers between heating time and cooling time. During heating time, the air may be discharged further obliquely such that the air goes further outward as it proceeds downward than during cooling time. For example, as the air within the vehicle cabin tends to contract during cooling and tends to expand and spread during heating, the air may be discharged in the direction indicated by arrow A in FIG. 3 during heating and may be discharged in the direction indicated by arrow B in FIG. 3 during cooling. A change of the air discharging direction in correspondence with the expanding or contracting direction of the air within the vehicle cabin reduces interference between the air curtain and the air within the vehicle cabin to thereby increase the force of the air curtain. This leads to more efficient inhibition of leakage of the cool and warm air.

In this example, the door discharge port 26 is disposed at a location which is shifted from the upper edge of the door opening portion 104 slightly toward the center of the vehicle cabin, as illustrated in FIG. 3, because a sufficient space for the door discharge port 26 cannot be ensured in the upper end of the door opening portion 104 where a large number of drive mechanisms such as the rails 112 are located. Therefore, if a sufficient space can be ensured in the upper end of the door opening portion 104, the door discharge port 26 may be disposed in the upper end of the door opening portion 104 (location P in FIG. 3, for example).

Further, in the above example, the lower end of the door opening portion 104 reaches the floor surface of the vehicle cabin. In other words, the lower end of the door opening portion 104 is flush with the floor surface of the vehicle cabin such that the end portion of the floor surface of the vehicle cabin in the vehicle width direction is flat. However, as indicated by a dashed and double-dotted line in FIG. 3, the vehicle cabin may include a raised portion 105 at the end of the floor surface to raise the level of the lower end of the door opening portion 104 with respect to the floor surface of the vehicle cabin. This configuration effectively reduces outflow of the internal air and inflow of the outside air. More specifically, in the absence of obstacles that inhibit air flow of the air curtain between the door discharge port 26 and the floor surface, the air of the air curtain flows actively; however, after the air of the air curtain hits the floor surface, part of the air jumps up to disturb the flow of the air curtain. This tends to lower the shielding effect of the air curtain around the floor surface. The raised portion formed around the floor surface effectively inhibits outflow of the internal air and inflow of the outside air.

Further, in the above example, the suction ports 20 are disposed on the ceiling portion of the vehicle 100, as described above. In this configuration, the air discharged from the door discharge port 26 and conveyed downward then moves upward due to a suction force generated by the suction ports 20, as indicated by arrow C in FIG. 3. The air moving upward is then suctioned by the suction ports 20 and is further supplied back to the door discharge port 26. As such, the suction ports 20 disposed on the ceiling portion of the vehicle 100 create circulation of the air in which the air from the suction ports 20 is supplied to the door discharge port 26, reaches the floor surface, and then returns to the suction ports 20. This circulation inhibits entry into the vehicle cabin of the air outside the vehicle. This circulation of air further distributes the air-conditioned air evenly within the whole vehicle cabin. In other words, the ceiling unit 14 further functions as a circulator that stirs and renders uniform the air within the vehicle cabin. In particular, as the air-conditioned warm air tends to move upward during heating, the door discharge port 26 is used to convey such warm air downward, to thereby increase comfort of passengers within the vehicle cabin.

In this example, the suction ports 20 are disposed at locations further forward and further rearward of the vehicle, respectively, with respect to the door opening portion 104. In other words, in this example, the suction ports 20 are disposed at locations that do not overlap the door opening portion 104 along the length of the vehicle. This configuration regulates an air flow from the door opening portion 104 directed toward the suction ports 20 further effectively, thereby reliably reducing flow of the outside air into the vehicle cabin. This further increases the air conditioning efficiency.

Figure 4:
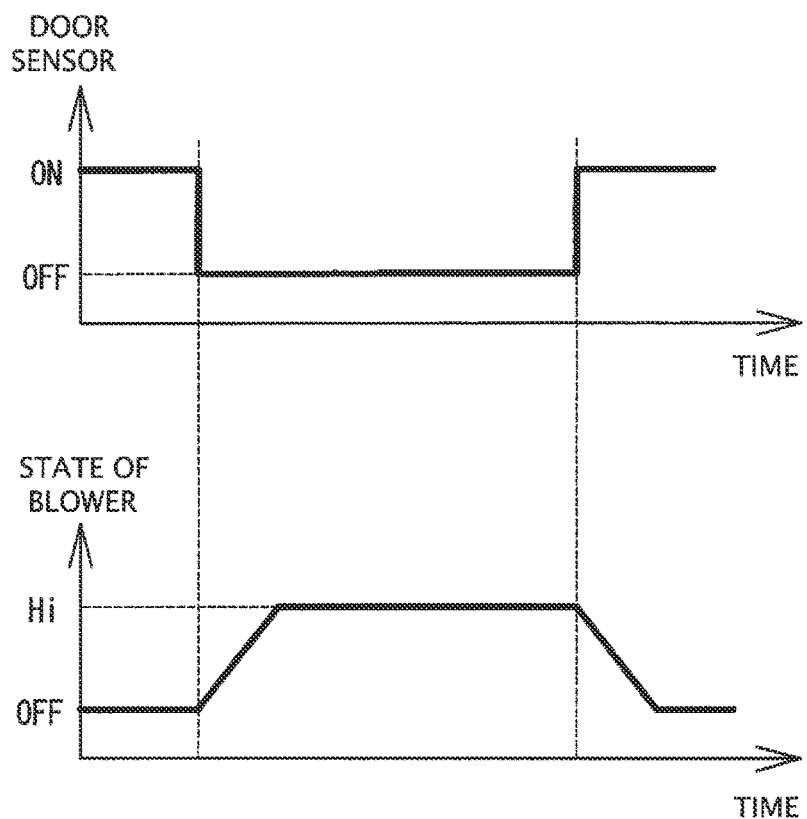
FIG. 4 is a graph showing a change in a signal from a door sensor and the driven state of an upper blower.

The formation of the air curtain described above is performed in conjunction with opening or closing of the doors 102. This will be described with reference to FIG. 4. FIG. 4 is a graph showing a change of a signal of the door sensor 110 and the driven state of the upper blowers 22. As described above, the door sensor 110 outputs an ON signal in response to the doors 102 being completely closed and outputs an OFF signal in response to the doors 102 being opened even slightly. The signal from the door sensor 110 is input to the air-conditioning controller 18.

The air-conditioning controller 18 drives the upper blowers 22 in response to a change of the signal from the door sensor 110 from ON to OFF. At this time, to reduce abrupt generation of blower noise, the air-conditioning controller 18 gently increases the output of the upper blowers 22. Driving the upper blowers 22 causes the air within the vehicle cabin to be suctioned through the suction ports 20 and also causes the suctioned air to be discharged downward through the door discharge port 26, thereby forming an air curtain.

In response to a change of the signal from the door sensor 110 from OFF to ON; that is, in response to complete closing of the doors 102, the air-conditioning controller 18 stops driving the upper blowers 22, thereby stopping formation of the air curtain. Formation of the air curtain only when the door 102 is opened as described above reduces power consumption of the upper blowers 22 as compared to the case where the air curtain is continuously formed.

While in this example, the upper blowers 22 are driven based on the signal from the door sensor 110, driving of the upper blower 22 may be controlled based on other information. For example, as the vehicle 100 in this example is used as a bus that stops at stopping places at regular intervals, the stopping timing of the vehicle 100 and the open/close timing of the doors 102 are predictable from the position and speed of the vehicle 100. Therefore, driving of the upper blowers 22 may be started in response to the vehicle 100 reaching near the stopping place or in response to the vehicle 100 coming to a halt at the stopping place. In other words, driving of the upper blowers 22 may be started before the signal from the door sensor 110 is changed from ON to OFF. This configuration enables high output of the upper blowers 22 upon starting to open the doors 102 to thereby allow formation of the air curtain in a complete form.

In some embodiments, the air curtain is formed only during cooling or heating. Alternatively, the air curtain may be formed when neither cooling nor heating is performed. In the latter case, the air curtain reduces entry into the vehicle cabin of contaminants outside the vehicle, such as pollen and Particulate Matter (PM) 2.5, thereby keeping the interior of the vehicle cabin further clean and comfortable.

Figure 5:
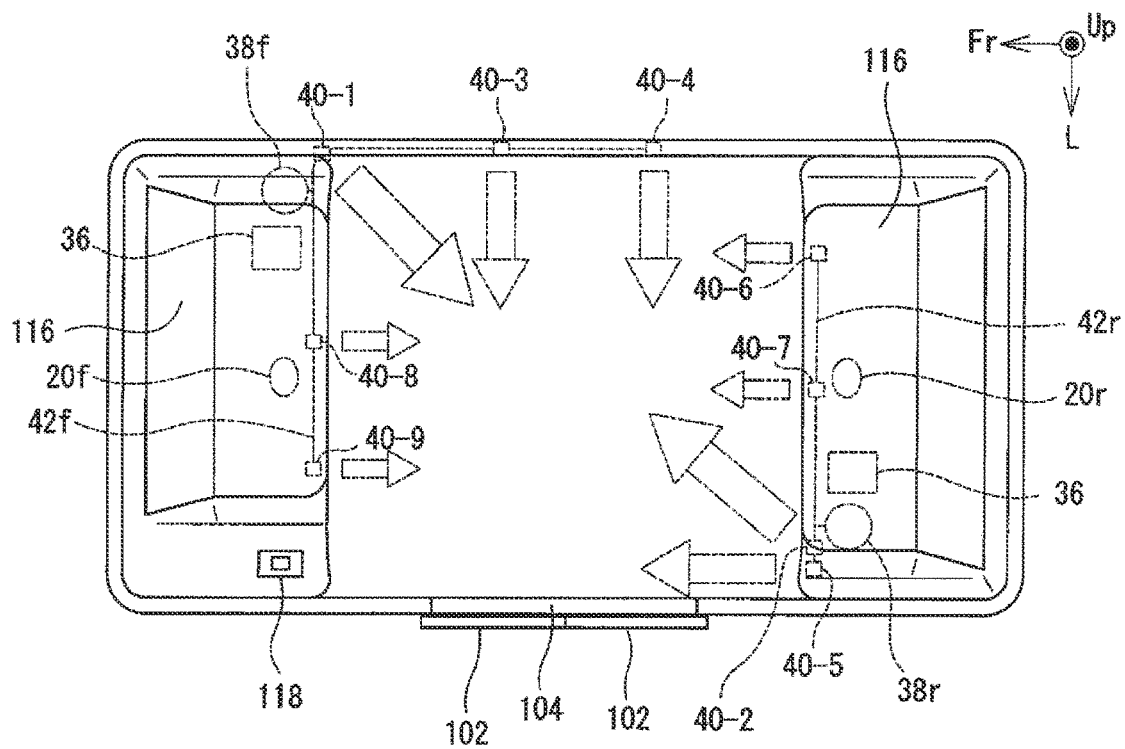
FIG. 5 is a diagram schematically illustrating the vehicle cabin viewed from above.

The operation of the floor unit 16 will be described by reference to FIG. 5. FIG. 5 schematically illustrates the vehicle cabin viewed from above. As the vehicle 100 is an automated driving vehicle, as described above, the vehicle cabin does not include a driver's seat, a steering wheel, or an acceleration pedal, for example. Meanwhile, the vehicle cabin includes, in its front end and rear end, bench seats 116 where passengers are seated. An operation panel 118 which is operated by the operator is further disposed beside the front bench seat 116.

The floor heaters 36 and the floor blowers 38 of the floor unit 16 are disposed under the seat surface of the bench seats 116. In the following description, the floor blower 38 disposed under the seat surface of the front bench seat 116 will be referred to as a "front floor blower 38f", and the floor blower 38 disposed under the seat surface of the rear bench seat 116 will be referred to as a "rear floor blower 38r". The floor duct 42 coupled with the front floor blower 38f will be referred to as a "front floor duct 42f" and the floor duct 42 coupled with the rear floor blower 38r will be referred to as a "rear floor duct 42r".

As illustrated in FIG. 5, the floor blower 38r is disposed opposite the front floor blower 38f in the vehicle length direction and is disposed at the opposite end in the vehicle width direction. In other words, the front floor blower 38f and the rear floor blower 38r are disposed at corners on the diagonal line of the vehicle cabin. In this example, the rear floor blower 38r is disposed at an end of the vehicle cabin in the width direction on the side where the door opening portion 104 is disposed.

The front floor duct 42f extends from the front floor blower 38f along the length and width of the vehicle, to form a substantially L shape as a whole. The front floor blower 38f communicates with a plurality of blast ports 40 which are disposed at intervals on a rising face of the front bench seat 116 and on a wall surface facing the door opening portion 104, as illustrated in FIG. 5.

The rear floor duct 42r extends from the front floor blower 38r along the width of the vehicle, to form a substantially I shape as a whole. The rear floor blower 38r communicates with a plurality of blast ports 40 which are disposed at intervals on a rising face of the rear bench seat 116, as illustrated in FIG. 5.

Each blast port 40 blows air toward the center of the vehicle cabin. The air may be warm air heated by the floor heaters 36 or the air within the vehicle cabin suctioned by the suction ports, which are not shown. In any case, the air blown from the blast ports 40 toward the center of the vehicle cabin converges near the center of the vehicle cabin and is likely to be directed upward. This allows the air near the floor of the vehicle cabin to actively move toward the suction ports 20 on the ceiling, where the air is suctioned through the suction ports 20 and discharged through the door discharge port 26, such that the air within the vehicle cabin circulates further smoothly.

In this example, the airflow rates of the air from the plurality of blast ports 40 vary depending on the positions of the blast ports 40. In FIG. 5, the size of blank arrows indicates the level of the airflow rate. In this example, as the distance from corners to the center of the vehicle cabin is long and high airflow rates are necessary to send the air to the center of the vehicle cabin, the blast ports 40-1 and 40-2 disposed at corners blow the air diagonally in the vehicle cabin at the highest the airflow rate, as is clear from FIG. 5. Further, in this example, the blast ports 40-3 and 40-4 disposed opposite the door opening portion 104, and the blast port 40-5 disposed at an end of the vehicle cabin in the vehicle width direction closer to the door opening portion to 104 to blow the air along the length of the vehicle, send the air at a higher airflow rate than that of the blast ports 40-6, 40-7, 40-8, and 40-9 disposed near the center of the vehicle cabin in the vehicle width direction to send the air along the length of the vehicle. This configuration reduces the inflow of the outside air through the door opening portion 104. More specifically, when the blast ports 40-3 and 40-4 opposite the door opening portion 104 blow the air at a high airflow rate, the air to flow into the vehicle cabin through the door opening portion 104 is pushed back by the strong air and is inhibited from entering the vehicle cabin. Similarly, when strong air passes the door opening portion 104 along the length of the vehicle at a location slightly inward from the door opening portion 104, the strong air reduces entry of the outside air into the vehicle cabin.

Typically, the airflow rate from the blast port 40 is higher at a location closer to the blower. Therefore, the floor blowers 38 may be disposed at corners of the vehicle cabin. This configuration increases the airflow rates of the air from the blast ports 40-1 and 40-2 that send the air diagonally in the vehicle cabin, the blast ports 40-3 and 40-4 opposite the door opening portion 104, and the blast port 40-5 disposed at an end of the vehicle cabin in the vehicle width direction closer to the door opening portion to send the air along the length of the vehicle.

As is clear from the above description, in this example, the air suctioned through the suction ports 20 disposed on the ceiling of the vehicle cabin is discharged downward from the discharge port disposed on the upper end of the opening portion. This effectively reduces entry of the outside air and outflow of the interior air through the opening portion, leading to a further increase in the air conditioning efficiency. It should be noted that the configuration described above is only an example, and there may be employed any modified configurations including the suction ports disposed on the ceiling of the vehicle cabin, the discharge port that discharges air downward from the upper end of the opening portion, and ducts that guide the suctioned air to the discharge port. For example, while in the above example, the discharge port is disposed only near the door opening portion 104, the discharge port may be disposed near an opening portion other than the door opening portion 104. For example, a vehicle may include a luggage space connected to the vehicle cabin, with a luggage opening portion being reclosable by a luggage door mounted to the luggage space. In this configuration, the discharge port may be disposed near the luggage opening portion to discharge the air in conjunction with opening or closing of the luggage door. Alternatively, the vehicle 100 in this example may be used as a shop such as a retail shop that sells various displayed products or a restaurant where cooked foods and beverages are provided, as described above. In this case, it is assumed that a certain window (that is, an opening portion) of the vehicle 100 is opened or closed at a high frequency to provide a product to customers; therefore, the discharge port maybe disposed near the window opening portion.

While in the above example, the vehicle includes, in addition to the ceiling unit 14, the cooler/heater unit 12, and the floor unit 16, these units may be omitted. Further, the location, shape, and number of the door opening portion 104 and the suction ports 20, for example, may be modified, as appropriate.

REFERENCE SIGNS LIST

10 air conditioner, 12 cooler/heater unit, 14 ceiling unit, 16 floor unit, 18 air-conditioning controller, 20 suction port, 22 upper blower, 24 upper duct, 26 door discharge port, 36 floor heater, 38 floor blower, 40 blast port, 42 floor duct, 100 vehicle, 102 door, 104 door opening portion, 105 raised portion, 106 door controller, 108 door driving mechanism, 110 door sensor, 112 rail, 116 bench seat, 118 operation panel.

The invention claimed is:

1. An on-vehicle air conditioner comprising:
   a suction port disposed on a ceiling portion of a vehicle cabin of a vehicle to suction air within the vehicle cabin, the suction port including a front suction port located further forward of the vehicle with respect to a door opening portion located in a center of a side portion of the vehicle and a rear suction port located further rearward of the vehicle with respect to the door opening portion;
   a discharge port disposed at an upper end of an opening portion located on a wall face of the vehicle to discharge air downward, the discharge port including a door discharge port disposed on a top portion of the door opening portion; and
   a duct configured to guide air suctioned by the suction port to the discharge port, the duct including a front upper duct that allows communication between the front suction port and the door discharge port and a rear upper duct that allows communication between the rear suction port and the door discharge port.

2. The on-vehicle air conditioner according to claim 1, further comprising:
   a plurality of blast ports configured to discharge air along a floor surface of the vehicle cabin toward a center of the vehicle cabin.

3. The on-vehicle air conditioner according to claim 1, comprising:
   a plurality of blast ports configured to discharge air along a floor surface of the vehicle cabin toward a center of the vehicle cabin, wherein
   of the plurality of blast ports, a blast port disposed opposite the door opening portion blows air at a higher airflow rate than that of a blast port disposed in the center of the vehicle cabin in a vehicle width direction to send air along a length of the vehicle.

4. The on-vehicle air conditioner according to claim 1, comprising:
   a plurality of blast ports configured to discharge air along a floor surface of the vehicle cabin toward a center of the vehicle cabin, and
   of the plurality of blast ports, a blast port disposed at an end of the vehicle cabin in a vehicle width direction closer to the door opening portion blows air at a higher airflow rate than that of a blast port disposed in the center of the vehicle cabin in the vehicle width direction to send air along a length of the vehicle.

5. The on-vehicle air conditioner according to claim 1, further comprising:
   an air-conditioning controller configured to control suction and discharge of air, the air-conditioning controller being capable of receiving an open/close signal for the opening portion, to allow discharge of air from the discharge port while the opening portion is opened and to stop discharge of air from the discharge port while the opening portion is closed.

6. The on-vehicle air conditioner according to claim 1, wherein
   the discharge port is disposed on the ceiling portion at a location further inward in a vehicle width direction with respect to the door opening portion, and
   the air is discharged from the discharge port obliquely such that the air goes further outward as the air proceeds further downward to reach ends of a floor surface in the vehicle width direction.

\* \* \* \* \*